(12) United States Patent
Margulis

(10) Patent No.: US 6,250,253 B1
(45) Date of Patent: Jun. 26, 2001

(54) METHOD AND APPARATUS FOR RESUSCITATION OF AQUATIC ANIMALS

(76) Inventor: David Jonathan Margulis, 442 Bethlehem Pike, Fort Washington, PA (US) 19034

( * ) Notice: Subject to any disclaimer, the term of this patent is extended or adjusted under 35 U.S.C. 154(b) by 0 days.

(21) Appl. No.: 09/580,297

(22) Filed: May 26, 2000

Related U.S. Application Data

(62) Division of application No. 09/105,927, filed on Jun. 27, 1998, now Pat. No. 6,067,936.

(51) Int. Cl.[7] ............... A01K 61/00; A61M 37/00; A61M 11/00; A62B 7/02
(52) U.S. Cl. ............... 119/201; 119/200; 604/24; 128/200.14; 128/200.25
(58) Field of Search ............... 119/200, 201, 119/202, 203, 215, 230, 231, 72, 74, 77; 222/402.1, 394; 604/23, 24, 26; 128/200.14, 200.23, 203.12, 204.11, 204.12, 200.24, 200.25

(56) References Cited

U.S. PATENT DOCUMENTS

| | | | | |
|---|---|---|---|---|
| Re. 35,895 | * | 9/1998 | Bass, Jr. et al. | 119/203 |
| 39,086 | * | 6/1863 | Williams | 222/394 |
| 3,154,075 | * | 10/1964 | Weckesser | 604/279 |
| 3,191,809 | * | 6/1965 | Schultz et al. | 222/182 |
| 3,368,302 | * | 2/1968 | Martino | 446/224 |
| 4,239,407 | * | 12/1980 | Knight | 401/190 |
| 4,241,833 | * | 12/1980 | Luebcke | 206/570 |
| 4,520,811 | * | 6/1985 | White et al. | 128/203.11 |
| 5,239,989 | * | 8/1993 | Chen | 128/200.24 |
| 5,409,148 | * | 4/1995 | Stern et al. | 222/402.1 |
| 5,605,259 | * | 2/1997 | Clawson et al. | 222/402 |
| 5,657,718 | * | 8/1997 | Drozdowski | 119/230 |
| 5,690,096 | * | 11/1997 | Burch | 128/204.18 |
| 5,704,909 | * | 1/1998 | Morrey et al. | 604/26 |
| 5,853,002 | * | 12/1998 | Kawasaki | 128/200.14 |
| 5,857,991 | * | 1/1999 | Grothoff et al. | 604/2 |
| 5,944,013 | * | 8/1999 | Burch | 128/205.14 |
| 6,021,776 | * | 2/2000 | Allred et al. | 128/200.21 |
| 6,125,843 | * | 10/2000 | Gold et al. | 128/200.23 |

FOREIGN PATENT DOCUMENTS

92/00667 * 1/1992 (WO) .

* cited by examiner

Primary Examiner—Charles T. Jordan
Assistant Examiner—Kimberly Smith
(74) Attorney, Agent, or Firm—William H. Meise

(57) ABSTRACT

A fish resuscitating apparatus includes a container of pressurized oxygen-rich fluid medium such as a gas or liquid. A valve controllably couples the fluid medium to a dispensing tip which is dimensioned to fit within the mouth of the fish. The dispensing tip is porous or perforated to allow the fluid to enter the mouth of the fish for aiding the fish in recovering from being caught. A kit of parts includes a container, a valve, and a plurality of tips of different dimensions, for use with different types of fish.

11 Claims, 2 Drawing Sheets

METHOD AND APPARATUS FOR RESUSCITATION OF AQUATIC ANIMALS

This is a division of U.S. patent application Ser. No. 09/105,927 filed Jun. 27, 1998 now U.S. Pat. No. 6,067,936.

FIELD OF THE INVENTION

This invention relates to resuscitation of aquatic animals such as fish, and to apparatus and methods for such resuscitation.

BACKGROUND OF THE INVENTION

Fishing is a very popular sport. In many cases, the fisherman does not need to eat the animal or fish which is caught, or for reasons of conservation desires to return the animal to the water. Part of the sport of fishing entails a struggle against the fish. When the fish is caught, it may often be because it is exhausted, and cannot any longer resist the line. Such fish or animals, because of their exhaustion, may not survive being removed from the hook and being returned to the aqueous medium, because of the combined effects of oxygen deprivation and the injury attributable to the hook or gaff.

Methods are known for oxygenating fish, as for example the arrangement described in U.S. Pat. No. 5,220,880, issued Jun. 22, 1993 in the name of Alworth et al. In this arrangement, the fish is placed upright in an aqueous medium through which oxygen is bubbled. Improved fish resuscitation apparatus and methods are desired.

SUMMARY OF THE INVENTION

Thus, an apparatus according to an aspect of the invention, for oxygenating an aquatic animal includes a container of compressed or pressurized oxygen-rich fluid medium, and a probe dimensioned to be accommodated within the mouth of an aquatic animal of a predetermined dimension, the probe having rounded edges to prevent injury to the aquatic animal during insertion of the probe into the mouth. The apparatus further includes a valve coupled to the container and to the probe, for controllably releasing the oxygen-rich fluid medium through the probe under manual control. In a particularly advantageous embodiment of the apparatus according to an aspect of the invention, the probe comprises an elongated tube defining a distal end and a proximal end. The proximal end of the tube is coupled to the valve. In this particularly advantageous embodiment of the invention, a fluid-permeable tip is coupled to the distal end of the tube, for receiving the oxygen-rich fluid medium, and for allowing the oxygen-rich fluid medium to escape from the apparatus.

Other embodiments of the invention include those in which the fluid-permeable tip has a larger diameter than the diameter of the tube. In one embodiment, the fluid-permeable tip comprises a curved metal sheet defining a plurality of apertures. In another embodiment of the invention, the fluid-permeable tip comprises a porous mass, such as sintered bronze or foamed dielectric material, as for example pumice or ceramic. In one embodiment of the invention, the oxygen-rich fluid medium is principally gaseous, and in another the medium is principally liquid. The gaseous medium may include nitrogen or some other inert gas, and may also include water vapor. The liquid medium includes water, which may be salt water. Since an aquatic animal to be resuscitated may be wounded, as for example by gaffing or a fishhook, the medium, whether gaseous or liquid, may be medicated. A preferred form of medication includes antibiotic material.

In one embodiment of the invention, the apparatus is a kit of parts for resuscitating aquatic animals. The kit of parts includes (a) a container of compressed or pressurized oxygen-rich fluid medium, (b) a fluid-controlling valve defining a distal end and a proximal end, the proximal end of the valve being coupled to the container, the distal end of the valve being fitted with a first portion of a connector arrangement, and (c) a plurality of fluid-permeable tips, each of the tips of the kit of parts being different in at least one of dimension and morphology from others of the tips of the kit of parts, each of the tips of the kit of parts including a second portion of the connector arrangement, such that any one of the tip may be coupled to the valve, for dispensing the oxygen-rich fluid when the valve is operated.

A particularly advantageous avatar of a kit of parts according to an aspect of the invention is one in which the valve comprises a distal tube, which distal tube defines a diameter and a distal end, the first portion of the connector arrangement is located at the distal end of the distal tube, and at least one of the tips has a diameter larger than the diameter of the distal tube In one embodiment of a kit of parts in accordance with an aspect of the invention, one or more of the fluid-permeable tips comprises a curved metal sheet defining a plurality of apertures through which the fluid may flow. In another embodiment, one or more of the fluid-permeable tips comprises a porous material, which may be a porous dielectric material such as pumice or foamed material.

A method according to an aspect of the invention for resuscitating an aquatic animal comprises the steps of (a) procuring an apparatus for oxygenating an aquatic animal, which apparatus comprises:

a container of compressed or pressurized oxygen-rich fluid medium;

a probe dimensioned to be accommodated within the mouth of an aquatic animal of a predetermined dimension, the probe having rounded edges to prevent injury to the aquatic animal during insertion of the probe into the mouth; and a valve coupled to the container and to the probe, for controllably releasing the oxygen rich fluid medium through the probe under manual control.

The method according to this aspect of the invention includes the further steps (b) of inserting the probe into the mouth of the aquatic animal, and (c) operating the a valve to thereby dispense the oxygen-rich fluid into the mouth of the aquatic animal.

In a method for resuscitating an aquatic animal using the kit of parts, the method includes the step of procuring, from a kit of parts for resuscitating aquatic animals comprising:

a container of compressed or pressurized oxygen-rich fluid medium;

a fluid-controlling valve defining a distal end and a proximal end, the proximal end of the valve being coupled to the container, the distal end of the valve being fitted with a first portion of a connector arrangement;

a plurality of fluid-permeable tips, each of the tips of the kit being different in at least one of dimension and morphology from others of the tips of the kit of parts, each of the tips of the kit of parts including a second portion of the connector arrangement, such that any one of the tips may be coupled to the valve, for dispensing the oxygen-rich fluid when the valve is operated a particular one of the tips which is smaller than the mouth of the aquatic animal to be resuscitated. The next step is to couple the selected one of the tips to the valve. The one of the tips is inserted into the mouth of the aquatic animal, and the valve, is operated to thereby dispense a quantity of the oxygen-rich fluid medium into the mouth of the aquatic animal.

DESCRIPTION OF THE INVENTION

The Alworth et al. patent adverted to above has the disadvantage that the size of the fish is not known a priori. Consequently, a plurality of the tanks or holders must be carried along during the fishing trip, and maintained in readiness for a fish. This results in a large and heavy group of devices, which is manifestly inconvenient.

Figure 1:
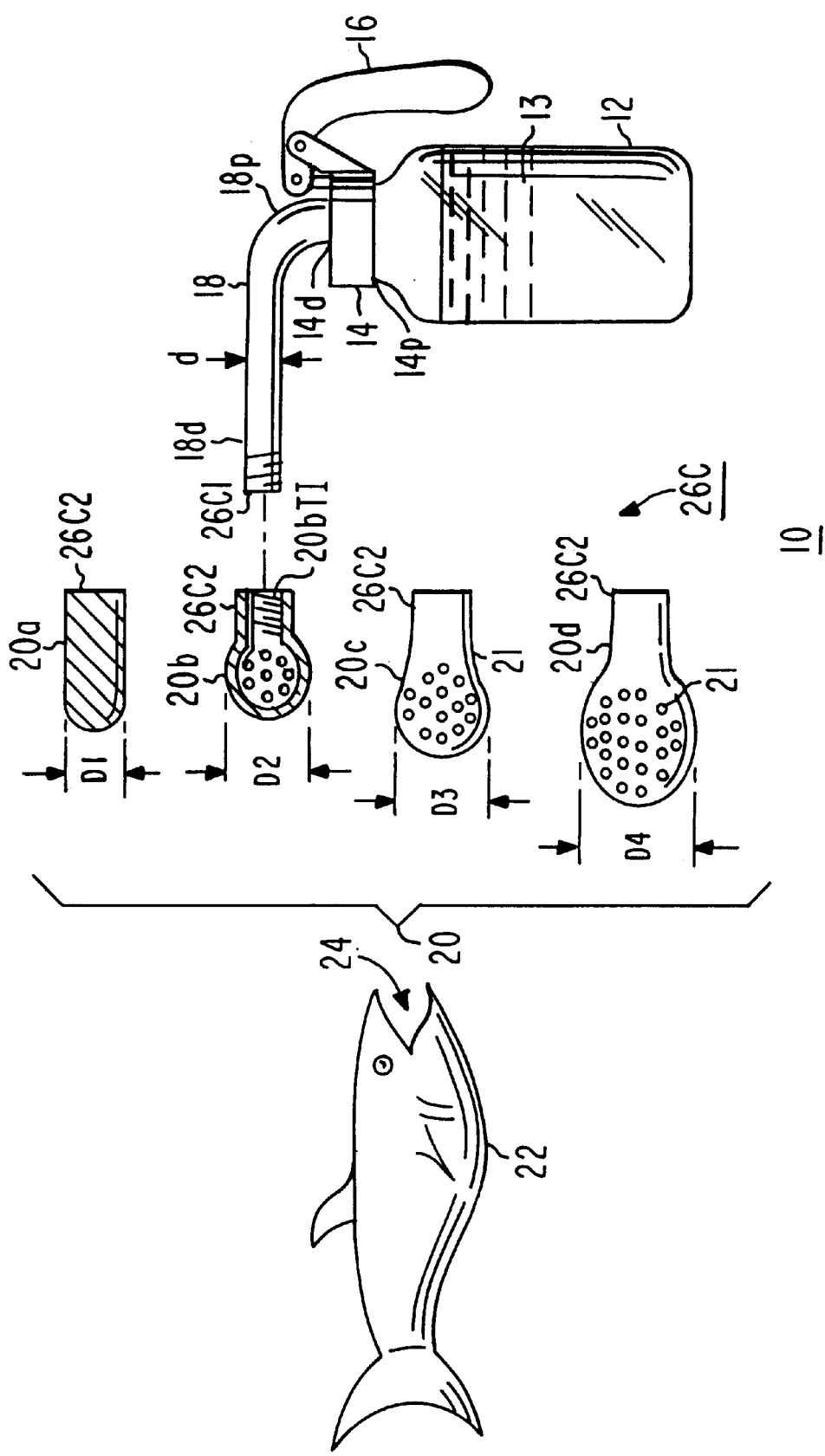
FIG. 1 is a simplified diagram of a fish oxygenating kit of parts or apparatus according to an aspect of the invention, in which the kit of parts includes inter alia a set of fluid-permeable tips, one of which is illustrated in cross-section, and further illustrating a fish which may be resuscitated according to a method according to another aspect of the invention.

FIG. 1 illustrates a kit of parts 10 according to an aspect of the invention, by which tips of a set 20 are selected to be of an appropriate size to be inserted into the mouth 24 of a fish 22, and which are used to dispense an oxygen-rich fluid medium for aiding in the resuscitation of played-out fish or other moribund animals.

More particularly, the kit of parts of FIG. 1 includes a pressure vessel or container 12, which contains an oxygen-rich fluid medium illustrated as 13. A valve illustrated as 14 has a proximal end 14p closing off the end of the container 12. Valve 14 has a manually operable lever 16 which, when depressed, allows the pressurized fluid medium 13 to escape from distal end 14d of the valve.

The kit of parts 10 of FIG. 1 also includes a set 20 including a plurality, illustrated as the number four, of tips, which are designated 20a, 20b, 20c, and 20d. These tips have rounded edges, or put another way have no sharp edges which might injure the animal when placed in the animal's mouth 24. A tip 20a, 20b, 20c, or 20d of set 20 of tips could be affixed directly to the distal end 14d of valve 14, but it is more convenient to interpose a pipe 18 in the fluid propagation path between the valve 14 proper and the attached one of the tips 20a, 20b, 20c, or 20d. As illustrated in FIG. 1, the proximal end of a pipe 18 is connected to the distal end 14d of valve 14. Pipe 18 has a diameter d near its distal end 18d. To aid in connecting the pipe to the selected one of the tips, a first portion or half 26C1 of a pipe connection device 26C is affixed to the distal end 18d of pipe 18, and the mating second portion or second half of the connection 26C is made a part of each of the tips 20a, 20b, 20c, or 20d. More particularly, the first portion 26C1 of the connector 26C is in the form of "male" pipe threads on the exterior of the distal end 18d of pipe 18, and the second or mating portion is in the form of corresponding "female" threads on an interior tube or channel portion of the tips 20a, 20b, 20c, or 20d. In FIG. 1, tip 20b is illustrated in section, so the threaded interior channel 20bTI of its connector portion 26C2 can be seen. The other tips 20a, 20c, and 20d of set 20 have similar threaded interior channels, all having the same dimensions so that they can mate with first connector portion 26C1 at the distal end 18d of pipe 18. Thus, any one of the tips 20a, 20b, 20c, or 20d of set 20 of tips can be coupled to valve 14 either directly (not illustrated) or by way of pipe 18, as illustrated. Conceptually, pipe 18 may be viewed as simply a more distal portion of the valve 14 than distal portion 14d.

As illustrated in FIG. 1, tips 20a, 20b, 20c, and 20d are bulbous, in that their diameters D1, D2, D3, and D4, respectively, are larger than the diameter d of pipe 18 in the vicinity of its distal end 18d. Tip 20a is illustrated as being cross-hatched, to indicate that it is made from a fluid-porous material, such as sintered bronze, foamed ceramic or plastic, or the like. Tips 20b, 20c, and 20d are illustrated as having discrete apertures 21 through which the fluid may flow. The bulbous shapes of tips 20b, 20c, and 20d may be fabricated by stamping and drawing perforated sheets of metal into the appropriate shape, or they may be made in any appropriate manner. As illustrated in the cross-section of tip 20b, connector portion 26C2 has an internally threaded portion such as 20bTI dimensioned to mate with the external pipe threads of connector portion 26C1 of pipe 18. Each of the corresponding connector portions 26C2 of each tip 20a, 20c, and 20d, respectively, has a similarly dimensioned internal pipe thread.

The fluid medium may be liquid or gaseous. Since pure oxygen gas might be harmful to some animals, the fluid medium, if gaseous, is cut with some inexpensive inert gas such as nitrogen, while still having a higher oxygen content than air. If the fluid medium is liquid, it is aqueous, and may be salt water.

Figure 2B:
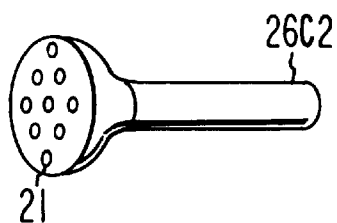
FIG. 2b illustrates a probe with a particular arrangement of apertures facing forward.
Figure 2A:
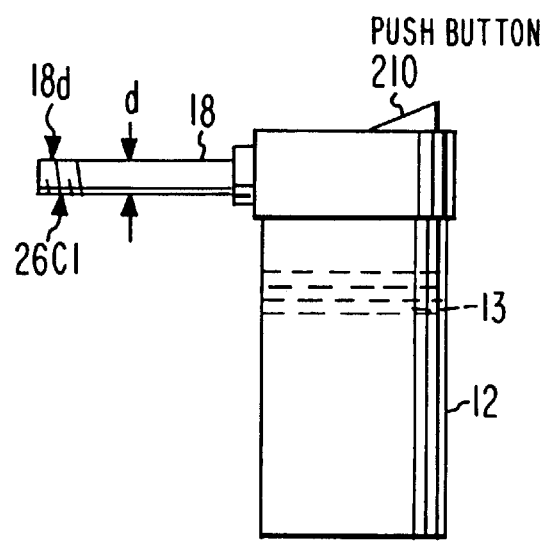
FIG. 2a illustrates another embodiment of the invention much like an aerosol paint dispenser.

FIG. 2a illustrates another arrangement according to an aspect of the invention, in which elements corresponding to those of FIG. 1 are designated by like reference numerals. In FIG. 2a, the appearance of the container, valve and probe differs somewhat from those of FIG. 1, but serve the same purpose. A push-button 210 similar to those on a common aerosol paint dispenser actuates the valve (not explicitly illustrated). FIG. 2a illustrates a probe in which the apertures or holes face in a forwardly direction, to direct the oxygen-rich medium toward the gill region of a fish.

Other embodiments of the invention will be apparent to those skilled in the art. For example, the fluid medium may include medication such as antibiotic matter for aiding in the healing of wounds, as might be occasioned by hooking or gaffing. To aid in overcoming shock attributable to injuries and oxygen deprivation, the medication may include adrenaline or the like.

Thus, an apparatus (10) according to an aspect of the invention, for oxygenating an aquatic animal (22) includes a container (12) of compressed or pressurized oxygen-rich fluid medium (13), and a probe (tube 18 and a probe of set 20) dimensioned to be accommodated within the mouth (24) of an aquatic animal (22) of a predetermined dimension, the probe (tube 18 and a probe of set 20) having rounded edges to prevent injury to the aquatic animal (22) during insertion of the probe (tube 18 and a probe of set 20) into the mouth (24). The apparatus (10) further includes a valve (14) coupled to the container (12) and to the probe (tube 18 and a probe of set 20), for controllably releasing the oxygen-rich fluid medium (13) through the probe (tube 18 and a probe of set 20) under manual control (lever 16). In a particularly advantageous embodiment of the apparatus (10) according to an aspect of the invention, the probe (tube 18 and a probe of set 20) comprises an elongated tube (18) defining a distal end (18d) and a proximal end (18p). The proximal end (18p)

of the tube (18) is coupled to the valve (14). In this particularly advantageous embodiment of the invention, a fluid-permeable tip (20a, 20b, 20c, or 20d of set 20) is coupled to the distal end of the tube (18), for receiving the oxygen-rich fluid medium (13), and for allowing the oxygen-rich fluid medium (13) to escape from the apparatus (10).

Other embodiments of the invention include those in which the fluid-permeable tip (20a, 20b, 20c, or 20d of set 20) has a larger diameter (D1, D2, D3, or D4) than the diameter (d) of the tube (18). In one embodiment, the fluid-permeable tip (20a, 20b, 20c, or 20d of set 20) comprises a curved metal sheet defining a plurality of apertures (21). In another embodiment of the invention, the fluid-permeable tip (20a, 20b, 20c, or 20d of set 20) comprises a porous mass, such as sintered bronze or foamed dielectric material, as for example pumice or ceramic. In one embodiment of the invention, the oxygen-rich fluid medium is principally gaseous, and in another the medium is principally liquid. The gaseous medium may include nitrogen or some other inert gas, and may also include water vapor.

The liquid medium includes water, which may be salt water.

Since an aquatic animal to be resuscitated may be wounded, as for example by gaffing or a fishhook, the medium, whether gaseous or liquid, may be medicated. A preferred form of medication includes antibiotic material.

In one embodiment of the invention, the apparatus is a kit of parts (10) for resuscitating aquatic animals (22). The kit of parts (10) includes (a) a container (12) of compressed or pressurized oxygen-rich fluid medium (13), (b) a fluid-controlling valve (14, 18) defining a distal end (14d) and a proximal end (14p), the proximal end (14p) of the valve (14) being coupled to the container (12), the distal end (18d) of the valve (14, 18) being fitted with a first portion (26C1) of a connector arrangement (26C), and (c) a plurality of fluid-permeable tips (20a, 20b, 20c, or 20d of set 20), each of the tips (20a, 20b, 20c, or 20d of set 20) of the kit of parts (10) being different in at least one of dimension and morphology from others of the tips (20a, 20b, 20c, or 20d of set 20) of the kit of parts (10), each of the tips (20a, 20b, 20c, or 20d of set 20) of the kit of parts (10) including a second portion (26C2) of the connector arrangement (26C), such that any one of the tip (20a, 20b, 20c, or 20d of set 20) may be coupled to the valve (14, 18), for dispensing the oxygen-rich fluid (13) when the valve (14) is operated.

A particularly advantageous avatar of a kit of parts (10) according to an aspect of the invention is one in which the valve (14, 18) comprises a distal tube (18), which distal tube (18) defines a diameter (d) and a distal end (18d), the first portion of the connector arrangement (26C1) is located at the distal end (18d) of the distal tube (18), and at least one of the tips (20a, 20b, 20c, or 20d of set 20) has a diameter (D1, D2, D3, or D4) larger than the diameter (d) of the distal tube (18).

In one embodiment of a kit of parts in accordance with an aspect of the invention, one or more of the fluid-permeable tips (20a, 20b, 20c, or 20d of set 20) comprises a curved metal sheet defining a plurality of apertures (21) through which the fluid may flow. In another embodiment, one or more of the fluid-permeable tips (20a, 20b, 20c, or 20d of set 20) comprises a porous material, which may be a porous dielectric material such as pumice or foamed material.

A method according to an aspect of the invention for resuscitating an aquatic animal (22) comprises the steps of (a) procuring an apparatus (10) for oxygenating an aquatic animal (22), which apparatus (10) comprises:

a container (12) of compressed or pressurized oxygen-rich fluid medium (13);

a probe (tube 18 and a probe of set 20) dimensioned to be accommodated within the mouth (24) of an aquatic animal (22) of a predetermined dimension, the probe (tube 18 and a probe of set 20) having rounded edges to prevent injury to the aquatic animal (22) during insertion of the probe (tube 18 and a probe of set 20) into the mouth (24); and a valve (14) coupled to the container (12) and to the probe (tube 18 and a probe of set 20), for controllably releasing the oxygen-rich fluid medium (13) through the probe (tube 18 and a probe of set 20) under manual control.

The method according to this aspect of the invention includes the further step of inserting the probe (tube 18 and a probe of set 20) into the mouth (24) of the aquatic animal (22), and operating the valve (14) to thereby dispense the oxygen-rich fluid into the mouth (24) of the aquatic animal (22).

In a method for resuscitating an aquatic animal (22) using the kit of parts, the method includes the step of procuring, from a kit of parts for resuscitating aquatic animals (22) comprising:

a container (12) of compressed or pressurized oxygen-rich fluid medium (13);

a fluid-controlling valve (14) defining a distal end and a proximal end, the proximal end of the valve (14) being coupled to the container (12), the distal end of the valve (14) being fitted with a first portion of a connector arrangement (26C);

a plurality of fluid-permeable tips (20a, 20b, 20c, or 20d of set 20), each of the tips (20a, 20b, 20c, or 20d of set 20) of the kit being different in at least one of dimension and morphology from others of the tips (20a, 20b, 20c, or 20d of set 20) of the kit of parts, each of the tips (20a, 20b, 20c, or 20d of set 20) of the kit of parts including a second portion of the connector arrangement (26C), such that any one of the tips (20a, 20b, 20c, or 20d of set 20) may be coupled to the valve (14), for dispensing the oxygen-rich fluid when the valve (14) is operated a particular one of the tips (20a, 20b, 20c, or 20d of set 20) which is smaller than the mouth (24) of the aquatic animal (22) to be resuscitated. The next step is to couple the selected one of the tips (20a, 20b, 20c, or 20d of set 20) to the valve (14, 18). The one of the tips (20a, 20b, 20c, or 20d of set 20) is inserted into the mouth (24) of the aquatic animal (22), and the valve (14, 18), is operated to thereby dispense a quantity of the oxygen-rich fluid medium (13) into the mouth (24) of the aquatic animal (22).

What is claimed is:

1. An apparatus for oxygenating an aquatic animal, said apparatus comprising:

a container of pressurized oxygen-rich fluid medium;

a probe dimensioned to be accommodated within the mouth of an aquatic animal of a predetermined dimension, said probe comprising an elongated tube defining a distal end and a proximal end, said proximal end being coupled to said valve, said probe further comprising a fluid-permeable tip, said tip being coupled to said distal end of said tube, for receiving said oxygen-rich fluid medium, and for allowing said oxygen-rich fluid medium to escape from said apparatus said probe having rounded edges to prevent injury to said aquatic animal during insertion of said probe into said mouth; and a valve coupled to said container and to said probe, for controllably releasing said oxygen-rich fluid medium through said probe under manual control; and wherein said fluid-permeable tip comprises a porous mass.

2. An apparatus according to claim 1, wherein said porous mass comprises a dielectric material.

3. An apparatus according to claim 2, wherein said dielectric material comprises a pumice-like ceramic.

4. An apparatus for oxygenating an aquatic animal, said apparatus comprising:

a container of pressurized oxygen-rich fluid medium;

a probe dimensioned to be accommodated within the mouth of an aquatic animal of a predetermined dimension, said probe having rounded edges to prevent injury to said aquatic animal during insertion of said probe into said mouth;

a valve coupled to said container and to said probe, for controllably releasing said oxygen-rich fluid medium through said probe under manual control; and wherein said fluid medium comprises liquid water.

5. An apparatus for oxygenating an aquatic animal, said apparatus comprising:

a container of pressurized oxygen-rich water medium;

a probe dimensioned to be accommodated within the mouth of an aquatic animal of a predetermined dimension, said probe having rounded edges to prevent injury to said aquatic animal during insertion of said probe into said mouth; and a valve coupled to said container and to said probe, for controllably releasing said oxygen-rich water medium through said probe under manual control, wherein said water is salt water.

6. An apparatus for oxygenating an aquatic animal, said apparatus comprising:

a container of pressurized oxygen-rich fluid medium;

a probe dimensioned to be accommodated within the mouth of an aquatic animal of a predetermined dimension, said probe having rounded edges to prevent injury to said aquatic animal during insertion of said probe into said mouth; and a valve coupled to said container and to said probe, for controllably releasing said oxygen-rich fluid medium through said probe under manual control; and wherein said oxygen-rich medium further contains medication.

7. A kit of parts for resuscitating aquatic animals, said kit of parts comprising:

a container of pressurized oxygen-rich fluid medium;

a fluid-controlling valve defining a distal end and a proximal end, said proximal end of said valve being coupled to said container, said distal end of said valve being fitted with a first portion of a connector arrangement;

a plurality of fluid-permeable tips, all of the tips of said plurality each of said tips of said kit being different in at least one of dimension and morphology from others of said tips of said kit of parts, with said at least one of dimension and morphology being for accommodation within the mouth of an aquatic animal of a predetermined different dimension, each of said tips of said kit of parts including a second portion of said connector arrangement, such that any one of said tips may be coupled to said valve to the exclusion of others of said tips, for dispensing said oxygen-rich fluid when said valve is operated;

wherein one of said fluid-permeable tips comprises a curved metal sheet with rounded edges, defining a plurality of apertures through which said fluid may flow.

8. A method for resuscitating an aquatic animal, said method comprising the steps of:

procuring an apparatus for oxygenating an aquatic animal, said apparatus comprising:

a container of pressurized oxygen-rich fluid medium;

a probe dimensioned to be accommodated within the mouth of an aquatic animal of a predetermined dimension, said probe having rounded edges to prevent injury to said aquatic animal during insertion of said probe into said mouth; and a valve coupled to said container and to said probe, for controllably releasing said oxygen-rich fluid medium through said probe under manual control;

inserting said probe into the mouth of said aquatic animal; and operating said valve to thereby dispense said oxygen-rich fluid into the mouth of said aquatic animal.

9. An apparatus for oxygenating an aquatic animal, said apparatus comprising:

a container of pressurized oxygen-rich fluid medium;

a probe dimensioned to be accommodated within the mouth of an aquatic animal of a predetermined dimension, said probe having rounded edges to prevent injury to said aquatic animal during insertion of said probe into said mouth, said probe comprising an elongated tube defining a distal end and a proximal end, said proximal end being coupled to said valve, and a fluid-permeable tip, said tip being coupled to said distal end of said tube and comprising a curved metal sheet defining a plurality of apertures, for receiving said oxygen-rich fluid medium, and for allowing said oxygen-rich fluid medium to escape from said apparatus; and a valve coupled to said container and to said probe, for controllably releasing said oxygen-rich fluid medium through said probe under manual control.

10. An apparatus according to claim 9, wherein said fluid-permeable tip has a larger diameter than said tube.

11. An apparatus according to claim 9, wherein said oxygen-rich fluid medium comprises a gas.

* * * * *